July 13, 1971     H. F. WUENSCHER     3,592,628
METHOD OF MAKING FOAMED MATERIALS IN ZERO GRAVITY
Filed Oct. 22, 1968
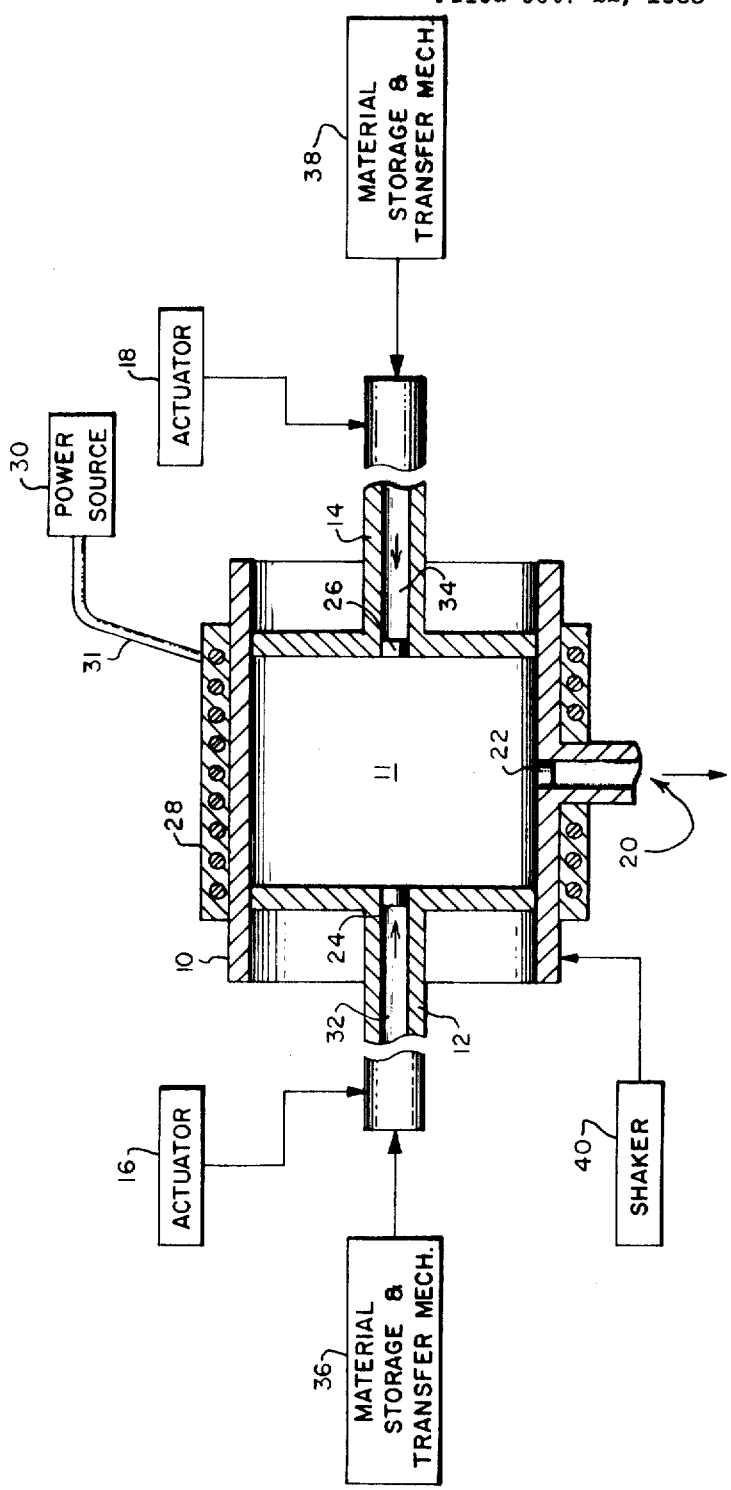
INVENTOR
HANS F. WUENSCHER
BY
Charles C. Wells
ATTORNEYS

United States Patent Office 3,592,628
Patented July 13, 1971

3,592,628
METHOD OF MAKING FOAMED MATERIALS IN ZERO GRAVITY
Hans F. Wuenscher, Huntsville, Ala., assignor to the United States of America as represented by the Administrator of the National Aeronautics and Space Administration
Filed Oct. 22, 1968, Ser. No. 769,665
Int. Cl. C21c 7/00; C22c 1/08
U.S. Cl. 75—20F      3 Claims

ABSTRACT OF THE DISCLOSURE

A method of making homogeneous foamed materials by mixing two or more materials having different physical properties in a zero-gravity environment. The materials are stored as liquids, gases and solids, the solid materials being in particles like powders and fibers. When making a homogeneous solid structure from two or more solid materials the solid materials are heated to change the state of one or more of the materials to a liquid for mixing. A foamed material can be made by decomposition of one material in a liquid or by injection of an inert gas into a liquid. Inert gas can also be injected into a homogeneous mixture of a liquid and solid particles. The mixture is then agitated so as to form a homogeneous mixture of solids in liquids or gases in liquids. Due to the absence of gravity forces, i.e., dead weight, it is possible to uniformly disperse solid particles or a gas within a liquid and there is no tendency to separate out since settling of the heavier materials is eliminated. Since there is no tendency to separate the mixture can be cooled at length to form a desired homogeneous material.

ORIGIN OF INVENTION

The invention described herein was made by an employee of the United States Government and may be manufactured and used by or for the Government for governmental purposes without the payment of any royalties thereon or therefor.

BACKGROUND OF THE INVENTION

Field of the invention

The invention relates in general to manufacturing processes in a low or zero-gravity environment and more particularly it relates to a method of manufacturing foamed materials in zero gravity.

Considerable effort in the form of both study and experiment has been devoted toward determining if various processes and manufacturing operations (welding, tube brazing and high energy cutting for example) can be performed in a zero-gravity environment as well as on earth. The reason for this effort is to verify that such operation are feasible for the in space maintenance and modification of orbital space stations.

While manufacturing processes and operations of the type necessary for maintaining a space facility are very important there are other important categories of manufacturing operations that can be undertaken in a zero-gravity environment. There are some processes which can be performed much better in a zero-gravity environment than on earth and others that can be practiced only in a zero gravity environment. Processes such as vacuum melting, levitation melting, and vapor deposition are examples of processes which can be performed on earth, but can be better carried out in the vacuum of space mainly because of zero-gravity, but also because space is very clean and of unlimited volume. Various large and bulky structures for use as components in a space structure could perhaps be fabricated more economically in orbit than on earth and then deployed in orbit. Large and very long tubular structures could be extruded in a zero-gravity environment without supporting the finished end of the tube during the extruding operation. This is made possible by the weightlessness of objects in orbit about the earth. Such structures could be used in the construction of a space laboratory and in some instances it would appear more feasible to orbit materials and make such structures in space than to deploy the prefabricated structure. These and other processes which can be carried out only in a zero-gravity environment are processes of the kind contemplated by the present invention.

A comprehension of how significant the advances made possible by low and zero-gravity processes may be ean be had by considering the advances made possible with the development of vacuum processes in the 17th century. Until then every process was carried out at or above one atmosphere pressure. The development of vacuum processes was actually delayed because of the Horror Vacui philosophy of Middle Age clerical philosophers that a vacuum cannot exist because nature is afraid of an absolutely empty space. Scientists like Galileo and Kepler were convinced that vacuum exists in space and also that Toricelli's Mercury barometer contained a true vacuum above the mercury. After Galileo's trial and punishment. vacuum research was continued in secrecy until the story of the Magdeburg Hemispheres (1650) proved publicly the existence of a vacuum. Mr. Papin could then invent the atmospheric engine and put the weight of the atmosphere to work by producing a vacuum behind a piston. This opened the door for the invention of the steam engine and the vacuum tube. The discovery of the vacuum or rather of the fact that it was possible to escape the ocean of air around the earth belongs to the group of history changing events. On the other hand, there could still be some validity in the old "Horror Vacui" philosophy if one considers that even a vacuum is not a space with nothing in it, because there is still gravity present and it is impossible to eliminate gravity and at the same time belong to our universe. If there is no possible escape from our immersion in the ocean of gravity, then how about zero G in orbit?

While forces of gravity can be counterbalanced and a zero-gravity situation created for very short time periods in drop towers where acceleration forces on a falling capsule are controlled so as to exactly offset the effects of gravity; it is only in an orbiting body that prolonged zero-gravity can be obtained. In an orbiting body the orbital trajectory line of the center of gravity of the orbiting body is the locus of a curve where the zero gravity anomaly occurs. For practical engineering purposes, in a space laboratory the space around this free fall trajectory line is under zero-gravity conditions, but it should be remembered that this is not absolutely exact and that there will be some gravitational effects on objects and processes being carried out only few feet from the orbital trajectory line of the space laboratory.

It should also be noted that there are manufacturing processes of very short processing cycle time that use a low G environment. An example is the free fall casting of lead shot which was utilized centuries ago by pouring liquid lead through a screen atop a shot tower. Droplets of liquid lead are formed when the lead is passed through a screen and these droplets, due to their surface tension, assume the form of spheres and solidify during their descent through the shot tower.

Another example is the conversion of metals and nonmetals to powders by atomizing a liquid form of the metal or nonmetal which solidifies to form a powder while falling. However, it is not possible to reach true equilibrium condition in a process until the free fall duration has been extended to a considerable length of time as in orbit where an orbiting laboratory is consistently free falling around the earth.

SUMMARY OF THE INVENTION

The present invention is a method of making a homogeneous foamed material from two or more base materials having physical properties. The invention takes advantage of the very significant advantages in a processing in a weightless environment. For example, on earth when two materials, one of which is liquid and the other a solid, are mixed together there is a tendency for the solid component to either float or settle out because the solid component is more or less dense than the liquid component. In orbit or zero G, the components of different densities in a mixing do not separate. In addition, mixing by convection currents (thermal eddies) does not occur, which means that irregular heating or cooling patterns will not disturb process equilibrium condition. Another example of a stable condition which can be obtained in the zero-gravity environment is in a foamed liquid. In the presence of gravity the liquid between surface tension layers of the foamed liquids i.e., liquid in the individual bubbles, drains out. In a zero-gravity environment there is no tendency for the liquid in the foam to drain and thus stable foams can be produced from many liquid and gas mixtures.

The present invention contemplates the transfer of base materials like metals, nonmetals, gases and plastics from storage containers to a mixing and heating chamber where the materials are agitated and mixed to form a homogenous mixture. The mixture can be heated prior to mixing so that one of the materials is transformed into a liquid state while the other one remains in the solid state In some instance where super saturated alloys are to be formed from two materials like aluminum and titanium both will be brought to a liquid state. Materials like aluminum and Teflon particles can be transferred to the mixing chamber and heated until the aluminum is liquid and the Teflon gaseous. When mixed a foamed aluminum with Teflon residues would result. A gas like argon can be mixed with a liquid metal. The materials are mixed by activating a shaker connected to the mixing chamber. After a uniform dispersion has been obtained, of either gases or solids in the liquids, or liquid in a liquid, as the case may be, the mixture can be expelled through an outlet in the mixing chamber. The mixture could be cooled in the mixing chamber and then removed.

BRIEF DESCRIPTION OF THE DRAWING

The single figure of the drawing is a schematic illustration of an apparatus for practicing the invention.

DETAILED DESCRIPTION OF THE INVENTION

Referring now to the drawing wherein an apparatus for carrying out processes in accordance with the invention is illustrated. The apparatus includes a container 10 that partially encloses a mixing chamber 11. Container 10 is completely closed by two piston type devices 12 and 14 which are moved in or out of container 10 in a horizontal direction by actuators 16 and 18 mechanically linked (in a manner not shown) to the piston devices. The pistons could be of the rolling membrane type or any other which had suitable sealing characteristics. Container 10 has an outlet 20 that is opened or closed by a valve 22 which is schematically shown. Similar valves indicated by numerals 24 and 26 are positioned in conduits formed in pistons 12 and 14. The valves and mechanisms for actuating the valves are not illustrated since such valves and mechanisms are conventional and readily available.

Container 10 is surrounded by a heating coil 28 and connected to power source 30 through a suitable connection 31. The heating coil is for heating materials in the mixing chamber. Pistons 12 and 14 have centrally disposed conduits 32 and 34 formed therein and these conduits are connected to material storage containers and transfer mechanisms 36 and 38. The storage containers and transfer mechanisms can be any of several types depending upon what material is being transferred. The base materials to be mixed are stored in containers 36 and 38. When mixing is desired these materials are transferred from containers 36 and 38 into the mixing chamber through valves 24 and 26. In the case of liquids or gases a pressure device, a piston for example, could be used to move material from the storage container to the mixing chamber. However, most powdered materials would require some mechanical conveyor system, an auger for example, for material transfer. A shaker 52 is mechanically coupled to container 10 for shaking the container to mix any materials contained therein.

Materials placed in the mixing chamber can be removed by pushing pistons 12 and 14 inwardly after closing valves 24 and 26 so as to force the mixture out through valve 22 and outlet 20. Pistons 12 and 14 are moved in and out of container 10 by actuators 16 and 18. If desired, either one or both of the piston devices could be withdrawn from container 10 and any material therein removed. This latter approach would be required in instances wherein the material was allowed to solidify in the mixing chamber.

There are numerous combinations of materials which can be employed in future zero-gravity manufacturing processes for forming metal and nonmetal and gas composites having greatly improved physical properties. It will be possible to disperse metal and nonmetal particles uniformly throughout a metal or nonmetal matrix to form a homogeneous mixture so long as the properties of the materials are such that the matrix can be brought to a liquid state while the particles to be dispersed remain in the solid state. The materials to be mixed will be transferred into the mixing chamber in proper proportions and then heated until the matrix material becomes a liquid. The shaker is activated to agitate the mixture so that the solid particles in the mixture will be uniformly dispersed throughout the liquid to form a homogeneous mixture.

Such a mixture of a metal dispersed throughout a metal matrix is thorium and nickel wherein particles of thorium are dispersed in a nickel matrix. It is well known that thorium-nickel materials have very excellent high temperature characteristics, but the problem to date has been that such materials can be produced only in very thin sheets because of gravity separation of the thorium particles from the nickel base matrix. In zero-gravity any amount of such material could be produced in one batch and the material could be placed in any type of mold so as to produce a structure of any desired size or shape. In the case of a thorium-nickel mixture, the thorium would remain solid at a temperature at which the nickel matrix becomes a liquid.

Steel and/or titanium particles could be dispersed in an aluminum matrix to give a lightweight high strength, fracture and abrasive resistant material. Beryllium could be mixed in an aluminum matrix to form a material having greatly improved characteristics. Beryllium and aluminum structures are presently fabricated utilizing powder metallurgy techniques, but the resulting structure, while having improved characteristics, also has random defects in the form of soft spots wherein physical properties are below that of the rest of the structure. It has been concluded from testing that the random defects are inherent characteristics of the powder metallurgy process when applied to large structures; and that it is not possible to apply a sufficient uniform pressure to a large area of powders being compacted to avoid such defects.

In mixing a nonmetal material into a metal matrix there are many possibilities. Ceramic metal composites are presently produced by a powder metallurgy and the resulting composites are called "cermets." Other possible mixtures are steel-alumina mixture, nickel-thoria mixtures where thoria and alumina are the nonmetals dispersed in the metal matrix. Other new and improved mixtures will result from the mixture of metal oxides like alumina into aluminum steel, titanium and other metals. Such mixtures will have increased strength, improved chemical properties and abrasion resistance.

Nonmetal compounds such as carbide and boride in the form of powder can be dispersed into a matrix of magnesium, aluminum, titanium or steel for achieving structures having increased strengths, especially at elevated temperatures. Powders and fibers of metals can be mixed in a glass matrix in order to improve strength and/or establish magnetic and electric properties in a glass compound. It is recognized that glass does not actually become a liquid when heated to a certain temperature as does a metal, but rather the glass just gets less viscous as its temperature is increased. However, glass can be heated to a point where its viscosity is such that the metal powders or fibers can be uniformly dispersed therein. Another example of a metal and a nonmetal matrix would be metal powder dispersed in plastic or polymer matrices to fabricate materials and coatings for shielding against radiation.

To metals such as aluminum or titanium can be alloyed and mixed in a zero-gravity environment to form what can be termed a super saturated alloy. Titanium-aluminum alloys are restricted to an aluminum content of less than 10%. This is an inherent characteristic of this alloy and this aluminum content cannot be exceeded even when the two metals are alloyed in a zero-gravity environment. When this process is carried out in a terrestrial environment any excess aluminum that does not alloy with the titanium segregates itself from the alloyed material due to the difference in densities, aluminum being about half as dense as titanium. In zero-gravity, the titanium-aluminum alloy will not settle out of the excess aluminum and thus it is possible to uniformly disperse any excess aluminum uniformly throughout the alloy to form what could be termed a super saturated alloy.

In addition to processing two or more materials to come up with a homogeneous mixture of the material it is also possible to produce foamed materials in a zero-gravity environment that would be impossible to fabricate in a gravity field. In foaming of materials the two materials are transferred into the mixing chamber. One of the materials remains a liquid while the other material is decomposed to form a gas which will be dispersed throughout the liquid material in the form of bubbles when the mixing container is agitated by shaker 40. In performing the foaming process in this manner it should be noted that there will be some residue in the finished foamed material of the material that was decomposed to form the gas. Various hydrides, hydroxides and metal salts could be mixed with metal and nonmetal matrix materials to form a foamed metal. Polymeric materials are available that range from a low to a high temperature decomposition range and such materials could be used with various metal and nonmetal matrix materials. A specific example would be foamed aluminum which could be made by decomposition of Teflon particles in liquid aluminum. Steel can be foamed with potassium bromide salt or with sodium chloride or sodium hydroxide.

Another method of foaming a metal would be to transfer a powdered metal into the mixing chamber, heat it until it becomes liquid and then inject an inert gas into the chamber. The metal and gas when agitated would form a foam whose bubble size is regulated by varying the external pressure applied to the foamed mixture. Pressure variation is accomplished by moving pistons 12 and 14 in or out of the mixing chamber. A pressure increase would decrease the bubble size and thus the porosity of the foam.

What is claimed is:

1. A method of making a homogeneous foamed material in a zero gravity environment from materials having different physical properties such that there would be a separation of the materials in a terrestrial environment, said method comprising the steps of:

transferring a first material from a container into a mixing chamber positioned in a zero gravity environment;

transferring a second material into the mixing chamber, said second material having physical properties differing from those of said first material;

heating the materials in said mixing chamber to a point where one of the materials is in a gaseous state and the other a liquid state;

agitating the mixture so as to form a plastic homogeneous foamed mixture wherein said material in a gaseous state is uniformly distributed throughout said material in a liquid state and remains so distributed during subsequent processing; and removing said homogeneous mixture from the mixing chamber, cooling and recovering a solidified mass of the foamed material.

2. The method recited in claim 1 wherein said mixture is heated to a point that results in a change of state of both said first and second materials, said first material being a metal and said second material nonmetal particles, said second material having a decomposition temperature that falls within a range of temperatures wherein said first material is in a liquid state, whereby upon heating and agitation the second material will decompose and form gas bubbles in the liquid state of said first material and thereby form a foam when the mixture is cooled.

3. The method recited in claim 1 wherein said first material is a metal and said second material is a gas, said first material becoming a liquid upon heating and when the mixture is agitated the gaseous second material is uniformly dispersed throughout the liquid first materials in the form of bubbles that do not separate as the metal cools and returns to a solid state.

References Cited

UNITED STATES PATENTS 3,297,450   1/1967   Loska _____ 99—207X

OTHER REFERENCES

Lawler, Frank K., Military Creates New Foods, in Food Engineering, pp. 52–56, May 1966.

Food in Space, in Activities Report, 17(1), pp. 7–53, Spring 1965, Garrard Press, Champaign, Ill. (Note: pp. 7, 32–36 are representative.)

L. DEWAYNE RUTLEDGE, Primary Examiner

J. E. LEGRU, Assistant Examiner

U.S. Cl. X.R.
75—129, 135; 264—51